US008879381B2

(12) United States Patent
Wu

(10) Patent No.: US 8,879,381 B2
(45) Date of Patent: Nov. 4, 2014

(54) ETHERNET RING SYSTEM, TRANSIT NODE OF ETHERNET RING SYSTEM AND INITIALIZATION METHOD THEREOF

(75) Inventor: Shaoyong Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 948 days.

(21) Appl. No.: 12/484,314

(22) Filed: Jun. 15, 2009

(65) Prior Publication Data
US 2009/0268610 A1 Oct. 29, 2009

Related U.S. Application Data

(63) Continuation of application No. PCT/CN2007/003811, filed on Dec. 26, 2007.

(30) Foreign Application Priority Data

Sep. 25, 2007 (CN) .......................... 2007 1 0151869

(51) Int. Cl.
| | | |
|---|---|---|
| G01R 31/08 | (2006.01) | |
| H04L 12/28 | (2006.01) | |
| H04L 12/42 | (2006.01) | |
| H04L 12/40 | (2006.01) | |

(52) U.S. Cl.
CPC ............ *H04L 12/42* (2013.01); *H04L 12/40182* (2013.01)
USPC ........... 370/216; 370/218; 370/222; 370/402; 370/406

(58) Field of Classification Search
CPC ............ H04L 47/13; H04L 2001/0095; H04L 2012/421
USPC .................................. 370/216–218, 402–406
See application file for complete search history.

(56) References Cited

U.S. PATENT DOCUMENTS

| 6,766,482 B1 | 7/2004 | Yip et al. ....................... 714/717 |
| 2003/0165119 A1* | 9/2003 | Hsu et al. ...................... 370/258 |
| 2009/0016214 A1* | 1/2009 | Alluisi et al. ................. 370/228 |

FOREIGN PATENT DOCUMENTS

| CN | 1543136 A | 11/2004 | ............. H04L 12/28 |
| CN | 101001192 A | 7/2007 | ............. H04L 12/437 |
| CN | 101013922 A | 8/2007 | ............. H04L 12/437 |

OTHER PUBLICATIONS

Wu, Shaoyong, ZTE Corporation China, "Proposal for Ethernet ring protection initialization mechanism (G.8032);WD25", Sep. 18, 2007.
Masahiro Maruyoshi NTT Japan, "Draft ITU-T Recommendation G.8032/Y.1344", Jun. 4, 2007.
Masahiro Maruyoshi NTT Japan, "Proposal for Ethernet Rings Protection Switching Mechanisms; CD 08", Jan. 10, 2007.

* cited by examiner

*Primary Examiner* — Brandon Renner

(57) ABSTRACT

The present invention provides an Ethernet ring system, transit node of Ethernet ring system, and initialization method thereof, wherein the method includes the following steps: step 1, generating a transit node of Ethernet ring protection domain by means of ring nodes; step 2, detecting the link state of two ring ports by means of the transit node: if neither of the two ring ports is detected as in-fault, then recording ring the link state as initialization state, blocking at least one of the ring ports, setting the at least one blocked port in prerelease state, and sending a ring state query packet to a master node, by means of the transit node; step 3, when the ring state query packet is received, sending a ring state packet recorded by the master node to the ring port that receives the ring state query packet, by means of the master node; and step 4, checking whether the ring state packet sent by the master node have been received by the transit node of which the ring state is the initialization state; if so, unblocking the blocked port in the prerelease state, to realize initialization of the transit node.

13 Claims, 4 Drawing Sheets

Transit nodes do not acquire the real
ring state during initialization period

US 8,879,381 B2

ETHERNET RING SYSTEM, TRANSIT NODE OF ETHERNET RING SYSTEM AND INITIALIZATION METHOD THEREOF

This is a continuation of International Application PCT/CN2007/003811, with an International Filing Date of Dec. 26, 2007, which claims priority to Chinese Application No. 200710151869.6, filed Sep. 25, 2007, each of which is incorporated by reference.

FIELD OF THE INVENTION

The present invention relates to Ethernet ring automatic protection technical field, in particular to Ethernet ring automatic protection system, and transit node of the Ethernet automatic protection system and initialization method thereof.

BACKGROUND OF THE INVENTION

Ethernet ring protection system in RFC3619 comprises multiple nodes interconnected into a ring, on which multiple Ethernet ring protection domains can be defined. Each domain includes a master node, several transit nodes and a group of protected service Virtual Local Area Network (VLAN for short) for forwarding user data. Wherein, the two ports of the master node on the ring are defined respectively as primary port and secondary port; the protected service VLAN is defined as protection service VLAN. When the ring link is in no-fault state, the master node blocks the forwarding function of the protection service VLAN of the secondary port, so no loop appears in the network, which prevents Broadcast Storm caused by the network loop; when the ring link is in in-fault state, the master node unblocks the forwarding function of the protection service VLAN of the secondary port, so user data can flow through the secondary port of the master node, and service communication can be ensured. An Ethernet ring protection and control packet is a communication and control packet among nodes in the domain. When a node blocks its port, the ring control packet can still flow through without effect. When Ethernet ring protection system operates normally, each node of the ring records the current ring state as no-fault (UP) or in-fault (DOWN).

Ethernet ring automatic protection system in normal operation state in the prior art, as shown in FIG. 1, consists of nodes S1, S2, S3 and S4. The ring formed by the four nodes is configured with a Ethernet ring protection domain, in which is the master node (MASTER) and the other nodes S1, S3, and S4 are the transit nodes (TRANSIT). Two ring ports of the master node S2 are respectively primary port and secondary port, wherein, port 2 is the primary port (P) and port 1 is the secondary port (S). Besides, the protection service VLAN is also defined in the domain, in which every port in the ring is configured. When the ring link is UP, the master node S2 blocks data forwarding function of the protection service VLAN of the secondary port 1, to prevent network loop and avoid Broadcast Storm; when the ring link is DOWN, the master node S2 unblocks data forwarding function of the protection service VLAN of the secondary port 1, to communicate the data in the service VLAN again.

The master node sends periodically a ring link health detection packet (HELLO) to the primary port. When the ring link is UP, the HELLO packet flows through each transit node in turn, and reaches the secondary port of the master node. The HELLO packet can flow through the blocked secondary port of the master node to be received by the master node. If the master node fails to receive the HELLO packet in a given time, the ring link is deemed as in-fault.

When a neighboring link is detected as in-fault, the transit node sends a link fault alarm (LINK-DOWN) packet, which will be arrived at the master node by flowing through the ring link. Even if the secondary port of the master node is blocked, the LINK-DOWN packet can still flow through to the master node. After receiving the LINK-DOWN packet at the primary port or the secondary port, the master node considers the ring link is in-fault.

When fault of the ring link is detected, the master node records the ring state as DOWN, unblocks the forwarding function of the protection service VLAN of the secondary port, updates the Media Access Control (MAC for short) address table of the ring ports and sends a ring down notice (FLUSH-DOWN) packet to notify other nodes in the ring to conduct link fault switch. After receiving the FLUSH-DOWN packet, the transit node records the ring state as DOWN, and updates the MAC address table of the ring port. Data in the protection service VLAN start to be transmitted through a new route.

When a neighboring link is detected as in-fault, a node blocks the forwarding function of the protection service VLAN of a corresponding port; when the fault disappears, the forwarding function of the protection service VLAN of the port is still blocked, and switches to a prerelease (PREFORWARD) state. During the link fault period, the master node still sends the HELLO packet via the primary port; if the link fault disappears, the HELLO packet can flow through the blocked port and the link whose fault disappears. When the HELLO packet is received from the secondary port, it is considered that the ring link recovers, and record the ring state as UP, block again the forwarding function of the protection service VLAN of the secondary port, update the MAC address table of the ring port and send a ring recover notice (FLUSH-UP) packet to the ring to notify other nodes in the ring to conduct link-recover switch. After receiving the FLUSH-UP packet, the transit node records the ring state as UP, updates the MAC address table of the ring port, and unblock the forwarding function of the protection service VLAN of the port in the PREFORWARD state. Data in the protection service VLAN starts to be transmitted through a new route. If the node fails to unblock the port in the PREFORWARD state in a given time, the port will be unblocked automatically.

When configuring protection domain of Ethernet ring system, the transit node does not know whether the current ring state is UP or DOWN in initialization phase, and fails to enter a correct state. As shown in FIG. 2, the ring link is in UP state, nodes S1, S2, and S4 have all been configured with the ring protection domain, wherein S2 is the master node, and S1 and S4 are transit nodes. The master node S2 is able to receive the HELLO packet at the secondary port which is sent from the primary port, so it is considered that the ring link is in UP state and block the data forwarding function of the protection service VLAN of the secondary port. Node S3, which does not know the current state of the ring link in the initialization period, is configured as a transit node. Block the function of the protection service VLAN of the ring port for a period of time to prevent the loop, as the ring state notice of the master node cannot be obtained, the blocked port can not be unblocked, which leads to a long interruption of the service communication between nodes S1 and S4 in the ring.

SUMMARY OF THE INVENTION

The present invention mainly aims to provide an Ethernet ring system, transit nodes of the Ethernet ring system, and an initialization method for the transit nodes. At the initialization of the transit nodes, one port is blocked to avoid loop; after asking the master node for the real current ring state, the transit nodes enter a proper ring state and a protocol operation flow, so that the transit nodes at initialization in the Ethernet ring protection domain enter a proper state rapidly.

According to one aspect of the present invention, provides an initialization method for transit nodes in Ethernet ring system, including the following steps: step 1, generating a transit node of Ethernet ring protection domain by means of ring nodes; step 2, detecting the link state of two ring ports by means of the transit node: if neither of the two ring ports is detected as in-fault, then recording ring the link state as initialization state, blocking at least one of the ring ports, setting the at least one blocked port in prerelease state, and sending a ring state query packet to a master node, by means of the transit node; step 3, when the ring state query packet is received, sending a ring state packet recorded by the master node to the ring port that receives the ring state query packet, by means of the master node; and step 4, checking whether the ring state packet sent by the master node have been received by the transit node of which the ring state is the initialization state; if so, unblocking the blocked port in the prerelease state, to realize initialization of the transit node.

Preferably, In step 2, if at least one of the two ring ports is detected as in-fault, then blocking the fault port and marking the ring state as fault, by means of the transit node, to realize the initialization of the transit node.

In step 3, when the ring state query packet is received, if the ring state recorded by the master node is no-fault, then sending a ring recover notice packet, otherwise, sending a ring in-fault notice packet, by means of the master node.

In step 4, if the ring state packet sent by the master node is not received by the transit node of which the ring state is the initialization, the blocked port in the prerelease state will be unblocked after a given time to realize the initialization of the transit node.

Step 4 comprises that: when the ring recover notice packet sent by the master node is received by the transit node of which the ring state is the initialization state, recording the ring state as no-fault and unblocking the blocked port in the prerelease state. When the ring in-fault notice packet sent by the master node is received by the transit node of which the ring state is the initialization state, recording the ring state as in-fault and unblocking the blocked port in the prerelease state after a given time.

Wherein, the given time is set according to actual practices and is adjustable at any time.

According to another aspect of the present invention, further provides an Ethernet ring system, including: a ring node, for generating transit nodes of a Ethernet ring protection domain; wherein, the transit node comprise: a detecting module, for detecting link state of two ring ports; a recording module, for recording ring state as initialization state, blocking at least one ring port, setting the blocked port in a prerelease state, and sending a ring state query packet to a master node, if neither of the two ring ports is detected as in-fault; a sending module, for sending a ring state packet recorded by the master node to the ring port that receives the ring state query packet, when the ring state query packet is received; a receiving module, for receiving the ring state packet sent by the master node, by the transit node of which the ring state is the initialization state; and an unblocking module, for unblocking the blocked port in the prerelease state to realize the initialization of the transit nodes, if the ring state packet sent by the master node has been received by the receiving module.

According to yet aspect of the present invention, further provides a transit node, which is a ring node in Ethernet ring system protection domain, comprises: a detecting module, for detecting link state of two ring ports; a recording module, for recording ring state as initialization state, blocking at least one ring port, setting the blocked port in a prerelease state, and sending a ring state query packet to a master node, if neither of the two ring ports is detected as in-fault; a sending module, for sending a ring state packet recorded by the master node to the ring port that receives the ring state query packet, when the ring state query packet is received; a receiving module, for receiving the ring state packet sent by the master node, by the transit node of which the ring state is the initialization state; and an unblocking module, for unblocking the blocked port in the prerelease state to realize the initialization of the transit nodes, if the ring state packet sent by the master node has been received by the receiving module.

To sum up, the present invention provides an Ethernet ring system, transit nodes of the Ethernet ring system, and an initialization method for the transit nodes, which prevent the loop or in-fault circuit caused by the transit nodes at initialization without acquiring the real ring state, and improve the anti-failure ability of the ring protection system.

BRIEF DESCRIPTIONS OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein.

DETAILED DESCRIPTION OF THE PREFERRED EMBODIMENTS

With reference to the appended drawings, the preferred embodiments of the present invention are to be described in details below.

Figure 1:
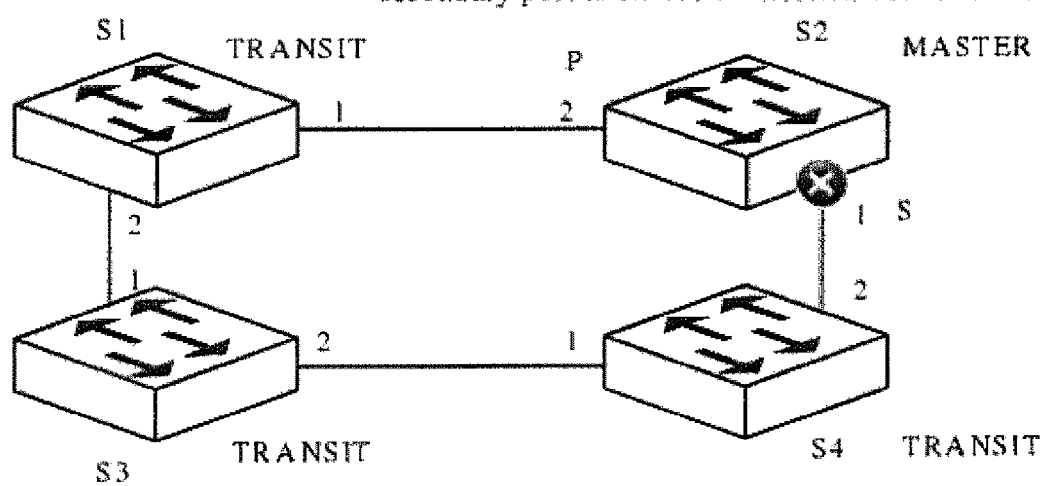
FIG. 1 is a schematic diagram of Ethernet ring protection system in the prior art.
Figure 2:
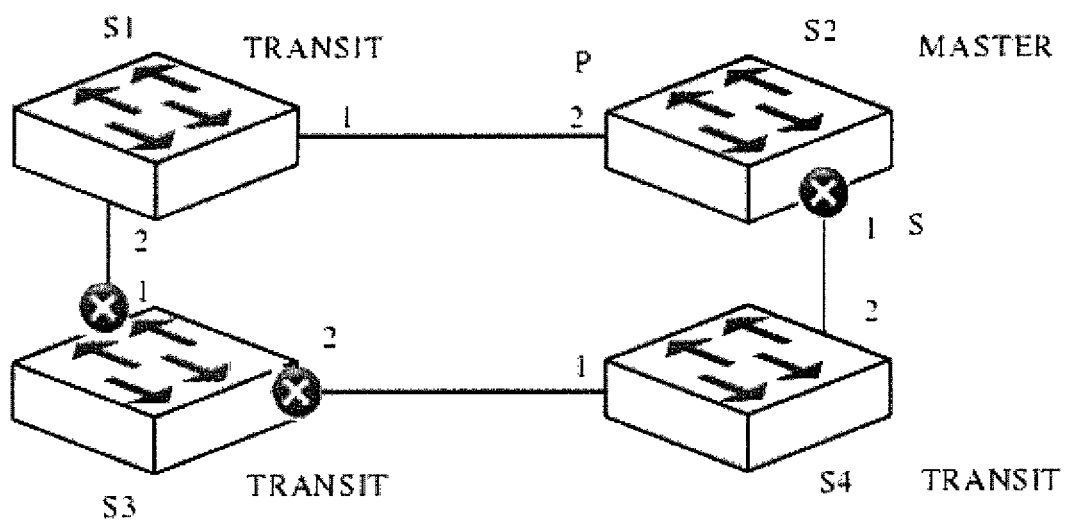
FIG. 2 is a schematic diagram of fault appearing during the initialization of transit nodes in Ethernet ring protection system in the prior art.
Figure 3:
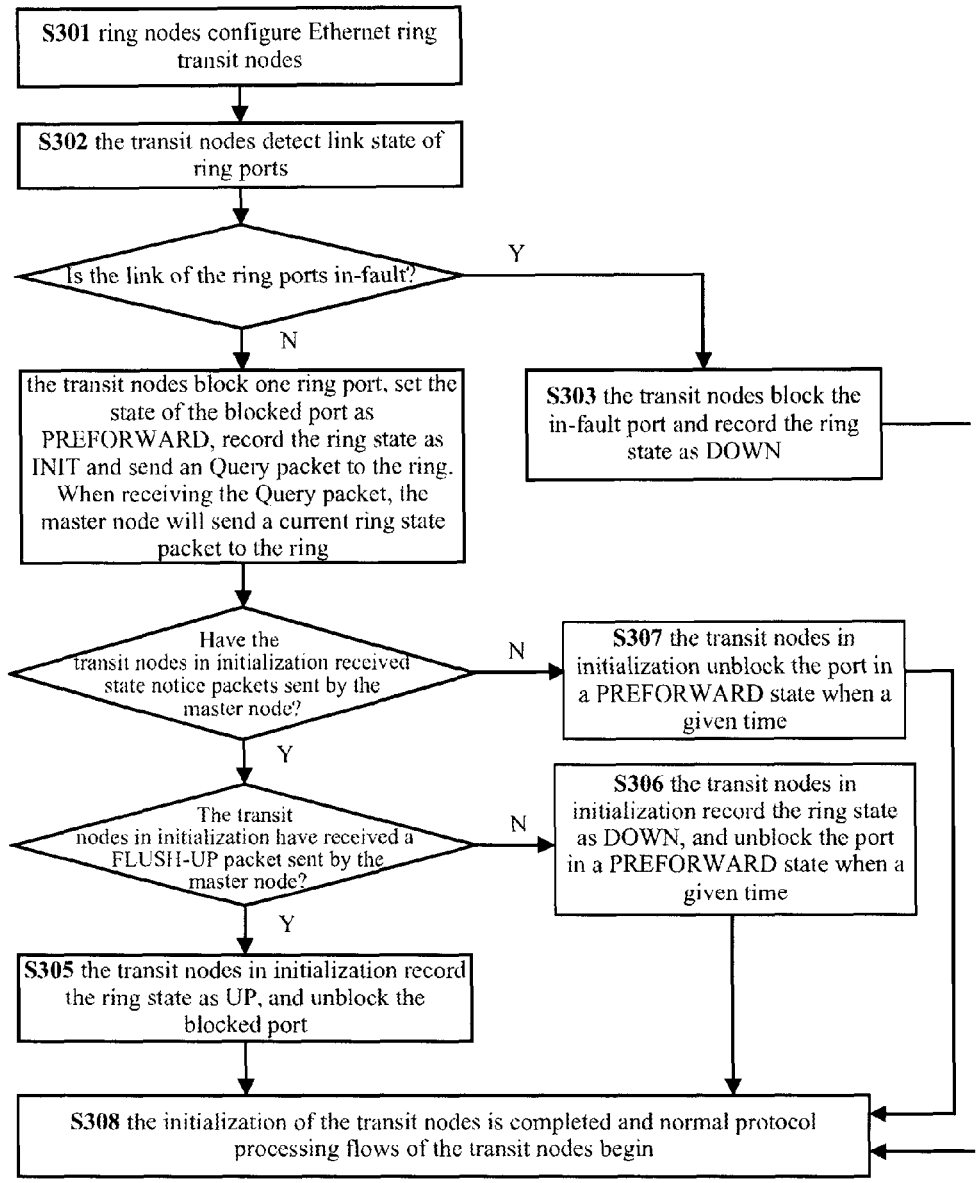
FIG. 3 is a flow chart showing the steps of the initialization method for the transit nodes in Ethernet ring system according to the present invention.

As illustrated in FIG. 3, the initialization method for the transit nodes in Ethernet ring system according to the invention comprises the following steps:

S301, transit nodes of Ethernet ring protection domain are configured by ring nodes.

S302, each of the transit nodes detects link state of two ring ports.

S303, if either of the two ring ports is in-fault, the in-fault port is blocked and ring state is recorded as DOWN; if both of the two ring ports are in-fault, both ports are blocked and the ring state is recorded as DOWN. And perform S308 directly.

S304, if neither of the two ring ports is in-fault, at least one ring port should be blocked, the blocked port state is set as PREFORWARD, the ring state is recorded as INIT and an query packet an ring state query packet is sent to the ring. When receiving the query packet, if the current ring state is UP, the master node sends a FLUSH-UP packet to the ring port receiving the query packet; if the current ring state is DOWN, the master node sends a FLUSH-DOWN packet to the ring port receiving a DOWN packet.

S305, when receiving the FLUSH-UP packet, the transit nodes in INIT state record the ring state as UP, unblock the blocked port in the PREFORWARD state and perform S308 directly.

S306, when receiving the FLUSH-DOWN packet, the transit nodes of which the ring state is INIT record the ring state as DOWN, unblock the blocked port in the PREFORWARD state after a given time and perform S308 directly.

S307, without receiving any ring state packet, the transit nodes of which the ring state is INIT will unblock the blocked port in PREFORWARD state after a given time.

S308, the initialization of the transit nodes is completed and normal protocol processing flows of the transit nodes begin.

Figure 4:
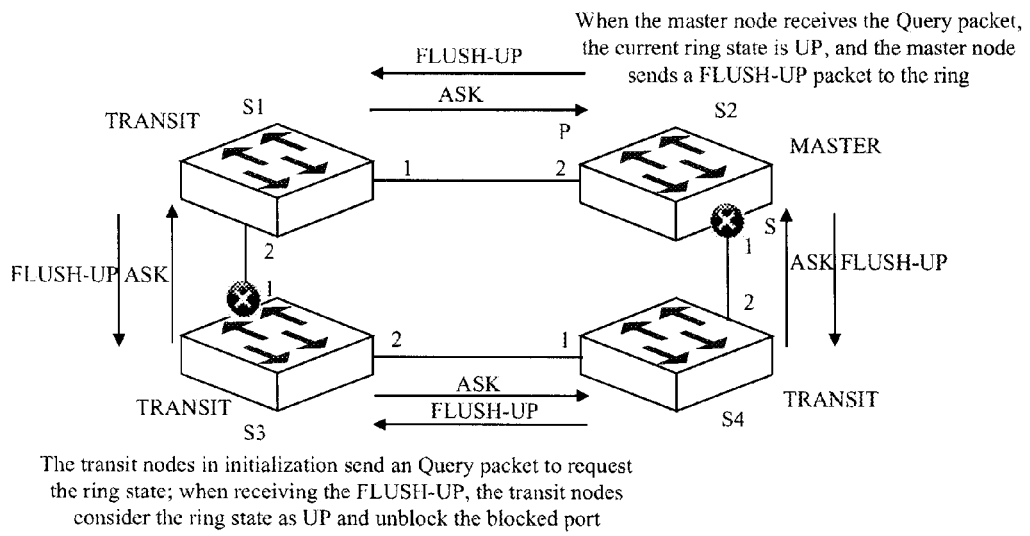
FIG. 4 is a schematic diagram showing without link-down of ring link according to the embodiment one of the present invention.
Figure 5:
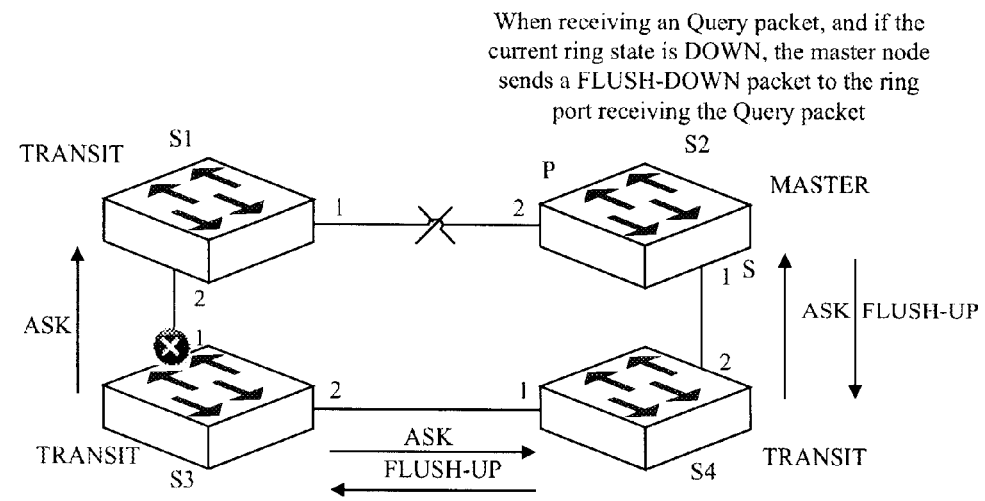
FIG. 5 is a schematic diagram showing link-down of the ring link according to the embodiment one of the present invention.

An embodiment of the present invention: there are three transit nodes and one master node in the ring. Master node S2 and two transit nodes S1 and S4 have operated normally. Transit node in Ethernet ring protection domain is configured by ring node S3, and transit node S3 begins initialization. If detecting no fault exist in the two ring ports, transit node S3 blocks at least one ring port, e.g. port 1, sets port 1 in PREFORWARD state to prevent network loop in the network, records the ring state as INIT and sends the query packet to the ring. The query packet is transmitted via each transit node to the master node S2. When receiving the query packet, the master node sends a ring state packet to ring ports receiving the query packet, according to the ring state recorded by the master node. If the primary port P receives the query packet, the master node sends the packet to the primary port P; if the secondary port S receives the query packet, the master node sends the packet to the secondary port S. As shown in FIG. 4, the ring state recorded by the master node is UP. When receiving the query packet, the master node sends the FLUSH-UP packet to ring ports receiving the query packet. When receiving the FLUSH-UP packet, the transit node S3 in INIT state records the ring state as UP, and unblocks the blocked port 1. The initialization of the transit node S3 is completed and normal protocol processing flows of the transit node S3 begin. As illustrated in FIG. 5, the ring state recorded by the master node is DOWN. When receiving the query packet, the master node sends the FLUSH-DOWN packet to ring ports receiving the query packet. When receiving the FLUSH-DOWN packet, the transit node S3 in INIT state records the ring state as DOWN, and unblock port 1 in PREFORWARD state after a given time. Till now the initialization of the transit node S3 is completed and normal protocol processing flows of the transit node S3 begin, with normal communication among each node.

Another embodiment of the present invention: there are three transit nodes and one master node in the ring. Master node S2 and two transit nodes S1 and S4 have operated normally. Transit node in Ethernet ring protection domain is configured by ring node S3, and transit node S3 begins initialization. If detecting no fault exist in the two ring ports, transit node S3 blocks at least one ring port, e.g. port 1, sets port 1 in the PREFORWARD state to prevent loop in the network, records the ring state as INIT and sends the query packet to the ring. If neither the primary port nor secondary port has received the query packet, the primary node will not send the ring state packets to the transit nodes. Port 1 in the PREFORWARD state will be unblocked after a given time. Till now the initialization of the transit node S3 is completed and normal protocol processing flows of the transit node S3 begin.

Still another embodiment of the present invention: there are three transit nodes and one master node in the ring. Master node S2 and two transit nodes S1 and S4 have operated normally. Transit node in Ethernet ring protection domain is configured by ring node S3, and transit node S3 begins initialization. If detecting a fault exists in one ring port, transit node S3 blocks the port in-fault, e.g. port 1, and sets port 1 in the PREFORWARD state, records the ring state as DOWN. After a given time, port 1 in the PREFORWARD state will be unblocked. Till now the initialization of the transit node S3 is completed and normal protocol processing flows of the transit node S3 begin.

Wherein, the given time is set according to actual practices and is adjustable at any time.

The embodiment of the present invention still provide an Ethernet ring system, including: a ring node, for generating transit nodes of a Ethernet ring protection domain; wherein, the transit node comprise: a detecting module, for detecting link state of two ring ports; a recording module, for recording ring state as initialization state, blocking at least one ring port, setting the blocked port in a prerelease state, and sending a ring state query packet to a master node, if neither of the two ring ports is detected as in-fault; a sending module, for sending a ring state packet recorded by the master node to the ring port that receives the ring state query packet, when the ring state query packet is received; a receiving module, for receiving the ring state packet sent by the master node, by the transit node of which the ring state is the initialization state; and an unblocking module, for unblocking the blocked port in the prerelease state to realize the initialization of the transit nodes, if the ring state packet sent by the master node has been received by the receiving module.

The embodiment of the present invention still provide a transit node, which is a ring node in Ethernet ring system protection domain, comprises: a detecting module, for detecting link state of two ring ports; a recording module, for recording ring state as initialization state, blocking at least one ring port, setting the blocked port in a prerelease state, and sending a ring state query packet to a master node, if neither of the two ring ports is detected as in-fault; a sending module, for sending a ring state packet recorded by the master node to the ring port that receives the ring state query packet, when the ring state query packet is received; a receiving module, for receiving the ring state packet sent by the master node, by the transit node of which the ring state is the initialization state; and an unblocking module, for unblocking the blocked port in the prerelease state to realize the initialization of the transit nodes, if the ring state packet sent by the master node has been received by the receiving module.

Ethernet ring system, transit nodes of Ethernet ring system, and the initialization method for the transit nodes provided in the present invention define the initialization state of the transit nodes. During the initialization, the transit nodes block a port to avoid loop; when acquiring the ring state sent from the master node, the transit nodes enter correct ring state, which prevents fault caused by the transit nodes as misjudging the ring state during the initialization period. Therefore, the reliability and stability of the system is improved. The invention can be used in multiple Ethernet ring protection technologies.

Obviously, one skilled in the art shall understand that various modules and steps above can be realized with general computing devices and can be integrated into one single computing device or distributed within a network consisting of multiple computing devices, and alternatively, the various modules and steps above can be realized with the program codes executable by the computing devices, and thus these program codes can be stored in memory devices so as to be executed by the computing devices, or the various modules and steps above can be formed into individual integrated circuit modules, or a plurality of the modules or steps can be formed into a single integrated circuit module so as to be realized. Therefore, the present invention is not limited to any particular hardware or software combination. It should be understood that alterations of the embodiments are apparent to one skilled in the art and do not depart from the scope and spirit of the present invention.

The descriptions above are only preferable embodiments of the present invention and shall not be understood as restrictions on the present invention. For those skilled in the art, the present invention may have various changes and variations. Any modifications, equivalent substitutions, improvements, etc, within the spirit and principle of the present invention shall all be included in the scope of protection of the present invention.

What is claimed is:

1. A method for initializing a transit node in an Ethernet ring network, the method comprising the following steps:
    Step 1, configuring a ring node as a transit node in an Ethernet ring protection domain, wherein the transit node has two ring ports;
    Step 2, the transit node detecting the link state on the two ring ports:
        if neither of two links of the two ring ports is detected as in--fault, then the transit node recording the ring state as an initialization state, blocking at least one of the two ring ports, setting the at least one blocked port to a prerelease state, and sending a ring state query packet to a master node to query a real current ring state;
    Step 3, when receiving the ring state query packet, the master node sends a ring state packet recorded by the master node to a ring port thereof from which the master node receives the ring state query packet; and
    Step 4, the transit node checking whether the ring state packet sent by the master node has been received; and if so, the transit node unblocking the blocked port in the prerelease state.

2. The initialization method according to claim 1, wherein, in Step 2:
    if at least one of the two ring ports is detected as infault, then the transit node blocking the in-fault port and marking the ring state as fault.

3. The method according to claim 1, wherein, in Step 3:
    when the master node receives the ring state query packet, if the ring state recorded by the master node is no-fault, then the master node sends a ring recover notice packet, otherwise, the master node sends a ring in-fault notice packet.

4. The method according to claim 1, wherein, in Step 4:
    if the ring state packet sent by the master node is not received by the transit node of which the recorded ring state is the initialization state, the blocked port of the transit node in the prerelease state will be unblocked after a given time.

5. The method according to claim 3, wherein Step 4 comprises:
    when the ring recover notice packet sent by the master node is received by the transit node of which the recorded ring state is the initialization state, the transit node records the ring state as no-fault and unblocking the blocked port in the prerelease state.

6. The method according to claim 3, wherein Step 4 comprises:
    when the ring recover notice packet sent by the master node is received by the transit node of which the recorded ring state is the initialization state, the transit node records the ring state as no-fault and unblocks the blocked port in the prerelease state.

7. The method according to claim 1, wherein Step 4 comprises:
    when a ring in-fault notice packet sent by the master node is received by the transit node of which the recorded ring state is the initialization state, the transit node records the ring state as in-fault and unblocking the blocked port in the prerelease state after a given time.

8. The method according to claim 3, wherein Step 4 comprises:
    when the ring in-fault notice packet sent by the master node is received by the transit node of which the recorded ring state is the initialization state, the transit node records the ring state as in-fault and unblocking the blocked port in the prerelease state after a given time.

9. The method according to claim 8, wherein the given time is adjustable at any time.

10. The method according to claim 4, wherein the given time is adjustable at any time.

11. The method according to claim 7, wherein the given time is adjustable at any time.

12. An Ethernet ring system, comprising:
    a ring node, configured to be a transit node in an Ethernet ring protection domain;
    wherein, the transit node has two ports and comprises a hardware processor configured to execute program units stored on a memory, the program units comprising:
    detecting means, for detecting a link state on the two ring ports;
    recording means, for recording ring state as initialization state, blocking at least one ring port, setting the blocked port to a prerelease state, and sending a ring state query packet to a master node to query a real current ring state, if neither of the two links of the two ring ports is detected as infault;
    sending means, for sending a ring state packet recorded by the master node to a ring port of the master node from which the master node receives the ring state query packet, when the ring state query packet is received;
    receiving means, for receiving the ring state packet sent by the master node, by the transit node of which the ring state is the initialization state; and
    unblocking means, for unblocking the blocked port of the transit node in the prerelease state, if the ring state packet sent by the master node has been received by the receiving means.

13. A transit node, which is a ring node in Ethernet ring system protection domain and has two ring ports, comprises a hardware processor configured to execute program units stored on a memory, the program units comprising:
    detecting means, for detecting link state of the two ring ports;
    recording means for recording the ring state as initialization state, and if neither of the two ring ports is detected as in-fault, blocking at least one ring port, setting the blocked port in a prerelease state, and sending a ring state query packet to a master node to query a real current ring state;

sending means for sending a ring state packet recorded by the master node to a ring port of the master node from which the master node receives the ring state query packet, when the ring state query packet is received;

receiving means for receiving the ring state packet sent by the master node, by the transit node of which the ring state is the initialization state; and unblocking means for unblocking the blocked port of the transit node in the prerelease state, if the ring state packet sent by the master node has been received by the receiving means.

\* \* \* \* \*